US011689523B2

(12) United States Patent
Rodriguez Bravo et al.

(10) Patent No.: US 11,689,523 B2
(45) Date of Patent: Jun. 27, 2023

(54) FACILITATING PASSWORD CREATION VIA A SECURE DEVICE

(71) Applicant: Kyndryl, Inc., New York, NY (US)

(72) Inventors: Cesar Augusto Rodriguez Bravo, San Rafael de Alajuela (CR); Kevin Jimenez Mendez, Heredia (CR); Ramamohan Chennamsetty, Hopewell Junction, NY (US); Mauro Marzorati, Lutz, FL (US)

(73) Assignee: Kyndryl, Inc., New York, NY (US)

( * ) Notice: Subject to any disclaimer, the term of this patent is extended or adjusted under 35 U.S.C. 154(b) by 294 days.

(21) Appl. No.: 16/818,987

(22) Filed: Mar. 13, 2020

(65) Prior Publication Data

US 2021/0288950 A1    Sep. 16, 2021

(51) Int. Cl.
*H04L 9/40*    (2022.01)

(52) U.S. Cl.
CPC ........ *H04L 63/083* (2013.01); *H04L 63/0861* (2013.01); *H04L 63/107* (2013.01); *H04L 63/20* (2013.01)

(58) Field of Classification Search
CPC . H04L 63/083; H04L 63/0861; H04L 63/107; H04L 63/20
USPC .......................................................... 726/1
See application file for complete search history.

(56) References Cited

U.S. PATENT DOCUMENTS

| 8,214,887 | B2 | 7/2012 | Clark et al. |
| 8,539,562 | B2 | 9/2013 | Bolik et al. |
| 8,776,194 | B2 | 7/2014 | Hitchcock et al. |
| 9,374,369 | B2 | 6/2016 | Mahaffey et al. |
| 9,860,246 | B1 | 1/2018 | Saylor et al. |
| 10,116,643 | B2 | 10/2018 | Uchil et al. |
| 10,791,119 | B1 * | 9/2020 | Coleman ............. H04L 63/0884 |

(Continued)

FOREIGN PATENT DOCUMENTS

| CN | 106790243 A | 5/2017 |
| WO | 0152023 A2 | 7/2001 |

OTHER PUBLICATIONS

Etienne, Stefan. The best hardware security keys for two-factor authentication. The Verge, Feb. 22, 2019. [15 printed pages] <https://www.theverge.com/2019/2/22/18235173/the-best-hardware-security-keys-yubico-titan-key-u2f>.

(Continued)

*Primary Examiner* — Brandon Hoffman
(74) *Attorney, Agent, or Firm* — VanLeeuwen & VanLeeuwen; Daniel C. Housley

(57) ABSTRACT

Techniques are described with respect to facilitating password creation via a secure device in a defined corporate environment. An associated method includes receiving an authentication request associated with an authorized client of a client system in the defined corporate environment and initializing the secure device with respect to the client system responsive to validating the authentication request. The method further includes creating a password for the client system in compliance with policy criteria associated with the defined corporate environment, encrypting the password, and distributing the password via at least one predetermined technique. In an embodiment, the method further includes creating access control credentials for the client system in compliance with the policy criteria associated with the defined corporate environment.

20 Claims, 7 Drawing Sheets

(56) References Cited

U.S. PATENT DOCUMENTS

| | | | | |
|---|---|---|---|---|
| 11,206,269 | B1* | 12/2021 | Van Deman | ............ G06F 21/45 |
| 2009/0150991 | A1 | 6/2009 | Hoey et al. | |
| 2015/0106893 | A1 | 4/2015 | Hou et al. | |
| 2015/0248553 | A1 | 9/2015 | Strand et al. | |
| 2016/0212141 | A1* | 7/2016 | Banerjee | ............ H04L 63/0846 |
| 2018/0285558 | A1 | 10/2018 | Neumann et al. | |

OTHER PUBLICATIONS

McAlisier, Daniel et al. Security Hardware Password Manager. IP.com, Mar. 20, 2009, Linux Defenders. [7 printed pages] <https://priorart.ip.com/IPCOM/000180925>.

Malafronte, Katie. California Bans Default Passwords for All IoT Devices. Campus Safety, Oct. 11, 2018. [5 printed pages] <https://www.campussaretymagazine.com/technology/california-bans-default-passwords-iot-devices/>.

Whittaker, Zack. California passes law that bans default passwords in connected devices. Tech Crunch, Oct. 5, 2018. [1 printed page] <https://techcrunch.com/2018/10/05/california-passes-law-that-bans-default-passwords-in-connected-devices/>.

Henry, Jasmine. These 5 Types of Insider Threats Could Lead to Costly Data Breaches. Security Intelligence, Aug. 21, 2018. [3 printed pages] <https://securityintelligence.com/these-5-types-of-insider-threats-could-lead-to-costly-data-breaches/>.

Mistretta, Samuel. Does one password reset cost your company $7 or $70 every time? The password is . . . Sparkhound, Accessed on Feb. 23, 2020. [1 printed page] <https://www.sparkhound.com/blog/does-one-password-reset-cost-your-company-7-or-70-every-time-the-password-is>.

What's the Difference Between USB and UDISK? Nexcopy Incorporated, Jun. 7, 2017. [3 printed pages] <https://www.getusb.info/whats-the-difference-between-usb-and-udisk/>.

* cited by examiner

FACILITATING PASSWORD CREATION VIA A SECURE DEVICE

BACKGROUND

The various embodiments described herein generally relate to workstation security. More specifically, the various embodiments relate to facilitating password creation via a secure device.

Computer system security in a corporate setting requires proper client authentication as well as proper creation and maintenance of passwords and access control credentials. While various conventional solutions exist with respect to secure password creation and maintenance, such solutions often require special software or drivers for each affected computer system, thus incurring significant financial and/or efficiency costs. Furthermore, such conventional solutions often require native or otherwise predetermined computer system support for various authentication and/or password creation features.

SUMMARY

The various embodiments described herein provide techniques of facilitating creation of a password, and optionally access control credentials, via a physical (i.e., hardware-based) secure device having self-configuration capabilities. An associated computer-implemented method of facilitating password creation via a secure device in a defined corporate environment includes receiving an authentication request associated with an authorized client of a client system in the defined corporate environment and initializing the secure device with respect to the client system responsive to validating the authentication request. The method further includes creating a password for the client system in compliance with policy criteria associated with the defined corporate environment, encrypting the password, and distributing the password via at least one predetermined technique. In an embodiment, the method further includes creating access control credentials for the client system in compliance with the policy criteria associated with the defined corporate environment. In an additional embodiment, the method further includes receiving an additional authentication request associated with an additional authorized client of an additional client system, initializing the secure device with respect to the additional client system responsive to validating the additional authentication request, and creating an additional password for the additional client system. In a further embodiment, the authentication request is validated only upon confirming that the secure device is within a predetermined location or geographic range. In a further embodiment, responsive to determining that the authorized client of the client system has a domain account such that credentials are stored on a directory server, the step of initializing the secure device with respect to the client system includes connecting to the directory server.

In an embodiment, the step of validating the authentication request includes receiving at least one biometric aspect associated with the authentication request via at least one biometric device and confirming that each of the received at least one biometric aspect corresponds to biometric information linked to the authorized client of the client system. In an additional embodiment, the step of validating the authentication request includes receiving at least one gesture associated with the authentication request via at least one motion detection device and confirming that each of the received at least one gesture corresponds to at least one gesture attribute linked to the authorized client of the client system. In a further embodiment, the step of validating the authentication request includes receiving a locational signal associated with the authentication request via a location detection device and confirming that the received locational signal originated within a predetermined location or geographic range. In a further embodiment, the step of validating the authentication request includes receiving a short range communication signal associated with the authentication request via a short range communication device, confirming that the received short range communication signal corresponds to short range communication information linked to the authorized client of the client system, and confirming that the received short range communication signal originated within a predetermined location or geographic range.

In an embodiment, the step of creating the password for the client system includes connecting, via a secure application programming interface (API), to a policy server among at least one policy server in the defined corporate environment, sending, via the secure API, the authentication request to the policy server, and receiving, via the secure API, policy data from the policy server addressing the authentication request. According to such embodiment, the policy server among the at least one policy server optionally is determined based upon corporate location of the client system or corporate role of the authorized client. In a further embodiment, the step of distributing the password via the at least one predetermined technique includes injecting the password into the client system.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having a processor and a memory storing an application program, which, when executed on the processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
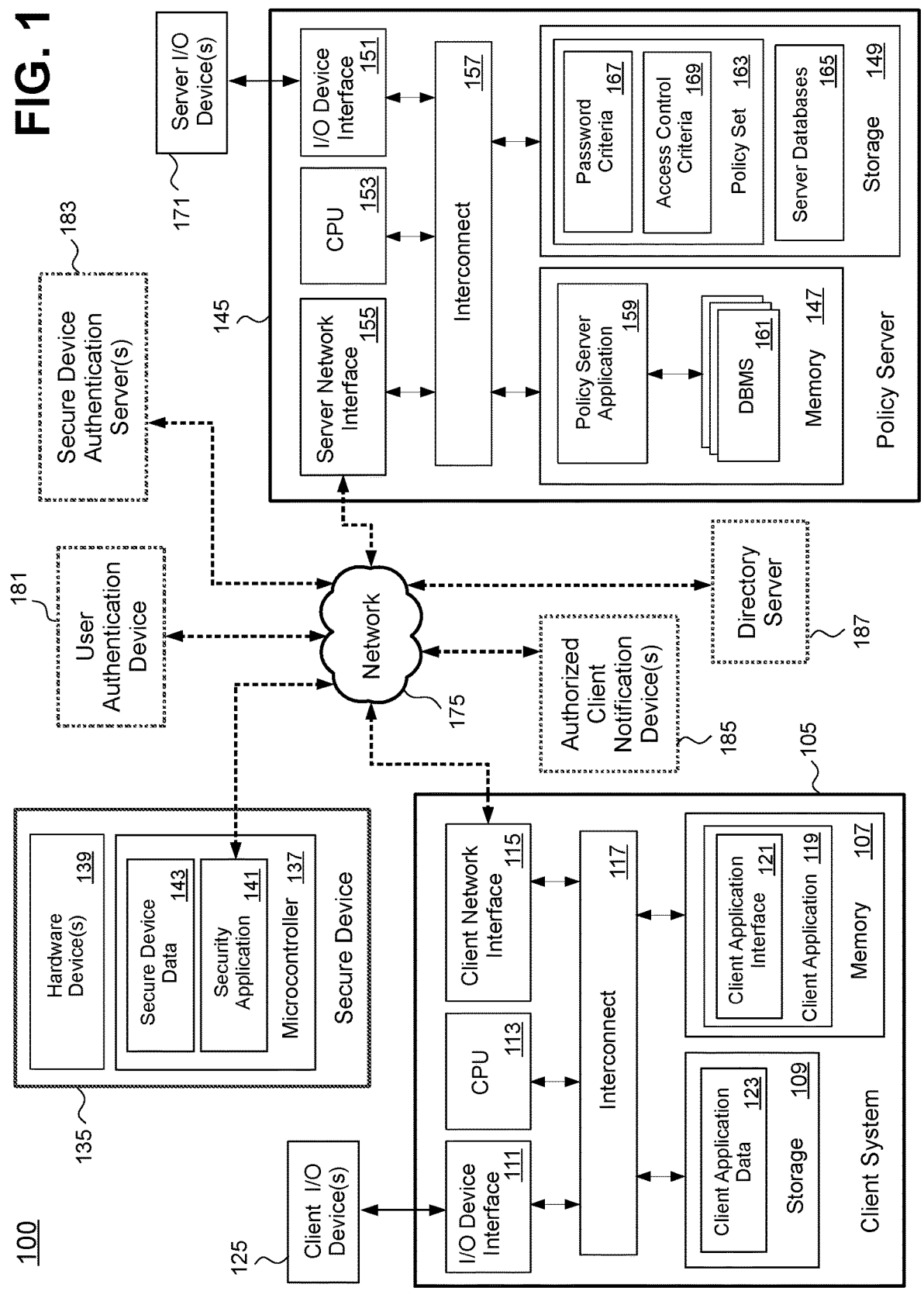
FIG. 1 illustrates a computing infrastructure, according to one or more embodiments.

The various embodiments described herein are directed to facilitating password creation in a defined corporate environment. A secure device configured to implement techniques associated with the various embodiments includes a security application configured to receive an authentication request associated with an authorized client of a client system and to create, encrypt, and distribute a password with respect to the client system upon validation of such authentication request. Optionally, the security application is further configured to create access control credentials with respect to the client system. In the context of the various embodiments described herein, a defined corporate environment is any environment in which security policies separate constituent systems from external systems. Examples of a defined corporate environment include an environment having constituent systems associated with a business (e.g., private enterprise, publicly traded company) or location(s)/division(s) thereof, an environment having constituent systems associated with a non-profit entity such as a charity or location(s)/division(s) thereof, an environment having constituent systems associated with a government/political entity or division(s) thereof, or an environment having constituent systems associated with any other type of organization or location(s)/division(s) thereof.

The various embodiments described herein may have advantages over conventional techniques. Specifically, the various embodiments may improve computer technology by facilitating password setup and/or access control credential setup on one or multiple client systems within a defined corporate environment via a hardware-based secure device. Moreover, by facilitating password creation by facilitating password injection and/or other controlled distribution techniques via such secure device, the various embodiments enable security processing that eliminates or reduces password and/or access control credential disclosure to human entities, even system administrators, thus reducing the risk of a data breach instigated by a malicious or negligent internal corporate insider. Additionally, the various embodiments may facilitate automation of password creation and distribution through application of self-configuration capabilities of such secure device, thus promoting creation of complex passwords in compliance with corporate policy criteria and furthermore potentially reducing financial and/or efficiency costs. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to facilitating password creation via a secure device. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client system 105, a secure device 135, and a policy server 145. Optionally, computing infrastructure further includes a user authentication device 181, at least one secure device authentication server 183, at least one authorized client notification device 185, and/or a directory server 187. Each component of computing infrastructure is directly or indirectly connected to a communications network 195. Computing infrastructure 100 is associated with a defined corporate environment.

Illustratively, client system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client system 105 are accessed and/or controlled by one or more authorized clients. Although shown as a single computing system, client system 105 is included to be representative of a single client system or multiple client system. The one or more authorized clients associated with client system 105 (or multiple respective client systems 105) include at least one entity (e.g., individual and/or group) associated with the defined corporate environment. In an embodiment, client system 105 is a thin client. Memory 107 includes a client application 119. In an embodiment, client application 119 is an online application configured for interfacing with secure device 135, policy server 145, and/or other computing systems. Client application 119 optionally is configured to communicate with secure device 135 and/or via policy server 145 with regard to client security. Client application 119 optionally is configured to accept injection or another technique of distribution of a new password and/or new access control credentials created for client system 105 via secure device 135. Client application 119 includes a client application interface 121. In the event of multiple clients, multiple instances of client system 105 may be present, each having a respective client application 119 including at least one respective client application interface 121. Client application interface 121 includes a graphical user interface (GUI), a command line interface (CLI), and/or a sensory interface (e.g., capable of discerning and processing sound/voice commands and/or gestures associated with the one or more authorized clients). Storage 109 includes client application data 123 associated with client application 119. One or more components of a GUI, a CLI, and/or a sensory interface included in client application interface 121 may facilitate authorized client input and/or may facilitate display of client application data 123. I/O device interface 111 is communicatively coupled to client I/O device(s) 125 (e.g., touchscreen console, trackpad, joystick, microphone, speaker, monitor, etc.). Authorized client(s) may interact with client application interface(s) 121 via client I/O device(s) 125. CPU 113 is included to be representative of a single CPU, multiple CPUs, a single CPU having multiple processing cores, and the like. Client network interface 115 is configured to receive data from and transmit data to secure device 135, policy server 145, and/or other computing systems via network 195.

Illustratively, secure device 135 includes microcontroller 137 and at least one hardware device 139. In an embodiment, secure device 135 is a portable (or otherwise mobile) hardware device, particularly a plug-and-play or self-configurable device such as a Universal Serial Bus (USB) drive or another hardware component configurable within a portable hardware interface. Secure device 135 optionally incorporates or is otherwise compatible with USB human interface device (USB-HID) capabilities. Based upon plug-and-play and/or self-configuration capabilities, secure device 135 is capable of interfacing directly with other computing systems (e.g., facilitating injection of a password and/or access control credentials) within the defined corporate environment without preinstallation of applications or other supporting software on such other computing systems. Accordingly, secure device 135 is compatible with (i.e., is configured to interface with or process data from) any external operating system. Microcontroller 137 includes security application 141 (loaded thereon) and secure device data 143. Security application 141 is configured to facilitate password creation according to the various embodiments described herein. In an embodiment, microcontroller 137 incorporates an integrated development environment (IDE) without a microprocessor or an operating system. According to such embodiment, microcontroller 137 optionally incorporates an open-source electronics platform, e.g., Arduino. In an alternative embodiment (not shown in FIG. 1), secure device 135 includes a microprocessor on a single board computer, e.g., Raspberry Pi. Secure device data 143 includes authentication information required for password creation and/or access control credential creation, e.g., cryptographic information and corporate policy information including password criteria and/or access control criteria associated with the defined corporate environment or location(s)/portion(s) thereof. Secure device data 143 optionally further includes some or all aspects of a corporate directory database associated with the defined corporate environment or location(s)/portion(s) thereof. The at least one hardware device 139 optionally includes one or more devices or device components configured to receive an authentication request for purposes of validation. Such devices or device components optionally include at least one biometric device, at least one motion detection device, a location detection device, and/or a short range communication device.

Although shown as a single computing system, policy server 145 is included to be representative of a single policy server system or multiple policy server systems. Policy server 145 is configured to provide authentication standards (e.g., policy criteria associated with the defined corporate environment) to secure device 135 via network 195, e.g., through a secure application programming interface (API). Furthermore, policy server 145 optionally is configured to facilitate password creation. In an embodiment, policy server 145 includes a single hardware server configured to provide hosting capabilities. In an alternative embodiment, policy server 145 includes, or is otherwise operatively coupled to, a plurality of hardware and/or virtualized servers configured to provide hosting capabilities. In a further alternative embodiment, policy server 145 is a cloud server system configured to provide distributed hosting capabilities via a plurality of nodes in a cloud computing environment. According to such further alternative embodiment, the cloud computing nodes are configured to communicate with one another. Additionally, according to such further alternative embodiment, the cloud computing environment optionally offers infrastructure, platforms, and/or software as a service for which client system 105 or other systems associated with computing infrastructure 100 need not maintain resources locally.

Illustratively, policy server 145 includes, or is otherwise operatively coupled to, memory 147, storage 149, an I/O device interface 151, a CPU 153, and a server network interface 155, all of which may be interconnected via interconnect 157 (e.g., a bus). Memory 147 includes a policy server application 159. Memory 147 further includes or is otherwise operatively coupled to database management system (DBMS) 161. DBMS 161 is included to be representative of a single database system or multiple database systems. In accordance with one or more embodiments, policy server application 159 facilitates authentication of client system 105 and/or other client systems in computing infrastructure 100 along with secure device 135. Additionally or alternatively, policy server application 159 sends authentication information associated with client system 105 and/or other client systems to directory server 187, which may in turn perform or facilitate authentication of client system 105 along with secure device 135.

Storage 149 includes a policy set 163. Policy set 163 optionally includes policy data for the defined corporate environment overall or alternatively includes policies for location(s) or portion(s) thereof. Policy set 163 includes password criteria 167 and access control criteria 169, which respectively include rules (with any exceptions) for creating a password and access control credentials with respect to client system 105 and/or other systems in the defined corporate environment. In an embodiment, one or more aspects of policy server application 159 and/or policy set 163 are cloud-based. Storage 149 further includes server databases 165. Sever databases 165 optionally are configured to organize and facilitate access to informational aspects of policy set 163. DBMS 161 includes or interfaces with at least one software application configured to manage server databases 165. In an embodiment, policy server application 159 sends database requests to DBMS 161 and processes results returned by DBMS 161. In a further embodiment, server databases 165 include one or more relational databases. In an additional embodiment, server databases 165 include one or more ontology trees or other ontological structures. Policy server 145 (and more generally computing infrastructure 100) may include any number of databases. According to a further embodiment, DBMS 161 sends requests to remote databases (not shown) via network 195.

I/O device interface 151 is communicatively coupled to server I/O device(s) 171. CPU 153 is included to be representative of a single CPU, multiple CPUs, a single CPU having multiple processing cores, and the like. Server network interface 155 is configured to receive data from and transmit data to client system 105 or other client system(s) via network 195. Specifically, via server network interface 155, policy server application 159 is configured to accept requests sent to policy server 145 by client system 105, secure device 135, and/or other system(s) and further is configured to transmit data to client system 105, secure device 135, and/or other system(s).

User authentication device 181 is configured to facilitate authentication by transmitting to secure device 135 an authentication request or aspect(s) thereof on behalf on a user (e.g., an individual or other entity such as a group)

requesting access to client system 105 by claiming to be or represent an authorized client. The at least one secure device authentication server 183 is configured to store client authentication information related to secure device 135 in the context of the defined corporate environment, such as a corporate directory database or aspects thereof, and optionally is configured to store client authentication information related to a plurality of other secure devices associated with corporate security. The at least one authorized client notification device 185 includes any device associated with an authorized client of client system 105 preconfigured to receive notifications regarding a password created via secure device 135. Directory server 187 is configured to remotely store domain account credentials of one or more authorized clients of client system 105 (and optionally other client system(s) in the defined corporate environment).

One or more aspects of computing infrastructure 100, including client system 105, secure device 135, and/or policy server 145, are configured to provide appropriate notice of any personal data collection to any affected entity, in accordance with any proper procedures in the defined corporate environment. Optionally, one or more aspects of computing infrastructure 100 further are configured to provide any affected entity an option to opt in or opt out of any such personal data collection, in accordance with any proper procedures in the defined corporate environment. Optionally, one or more aspects of computing infrastructure 100 further are configured to transmit at least one notification to any affected entity each time any such personal data collection occurs and/or at designated time intervals, in accordance with any proper procedures in the defined corporate environment.

Figure 2:
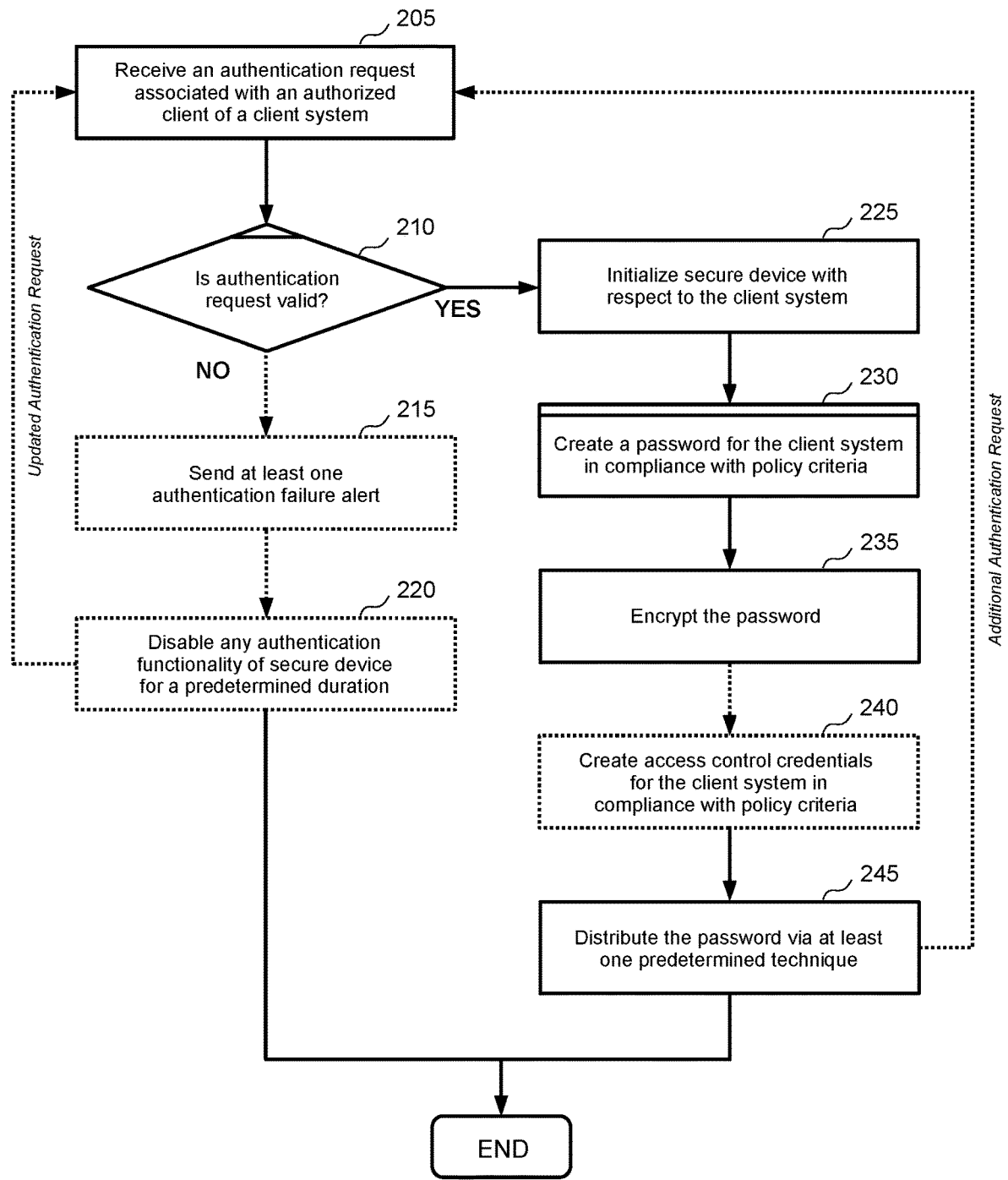
FIG. 2 illustrates a method of facilitating password creation via a secure device in a defined corporate environment, according to one or more embodiments.

FIG. 2 illustrates a method 200 of facilitating password creation via a secure device in a defined corporate environment. Aspects of the defined corporate environment are included in a computing infrastructure such as a client-server computing infrastructure (e.g., computing infrastructure 100) including a network (e.g., network 195). One or more steps associated with the method 200 and the other methods described herein may be carried out in the client-server computing infrastructure. A security application loaded on a microcontroller (or alternatively a microprocessor) of a secure device in the defined corporate environment (e.g., security application 141 of secure device 135) facilitates processing according to the method 200 and the other methods described herein. The security application interfaces with a client system (e.g., client system 105) in the defined corporate environment via a respective client interface associated with a client authentication application of the client system (e.g., client application interface 121 associated with client application 119). The security application interfaces with at least one policy server in the defined corporate environment (e.g., policy server 145) via a policy server application (e.g., policy server application 159). Additionally or alternatively to the client-server computing infrastructure, one or more steps associated with the method 200 and the other methods described herein may be carried out in association with one or more workloads of a cloud computing infrastructure. Additionally or alternatively, one or more steps associated with the method 200 and the other methods described herein may be carried out in a peer-to-peer network infrastructure, in which case one or more of the method steps described herein may be carried out in association with a peer application of a peer computing system.

The method 200 begins at step 205, where the security application receives an authentication request associated with an authorized client of a client system. The authentication request is initiated by a user claiming to be or represent the authorized client. In an embodiment, the authorized client to which the authentication request is associated is one of multiple authorized clients of the client system. In an additional embodiment, the authentication request includes at least one authentication technique. The at least one authentication technique includes one or more of biometrics (e.g., fingerprinting, eye scanning), gesture recognition (e.g., via an accelerometer or at least one video/audiovisual camera sensor), location detection (e.g., via a georeferencing technique such as GPS), and/or short range communication (e.g., via radio-frequency identification (RFID) or near-field communication (NFC)). In a further embodiment, the user submitting the authentication request transmits or otherwise facilitates validation of the authentication request via a user authentication device (e.g., user authentication device 181). Such user authentication device optionally is a smartphone, a laptop, a tablet, or other mobile device owned or otherwise associated with the user. In a further embodiment, in the context of the authentication request, the security application requires input of identification credentials of the authorized client to which the authentication request is associated along with a time-to-live limit for such identification credentials, e.g., twenty-four hours or a work shift length associated with the authorized client.

At step 210, the security application determines whether the authentication request is valid. In an embodiment, the security application determines validity of the authentication request by analyzing the authentication request via a policy server among the at least one policy server associated with the defined corporate environment. According to such embodiment, the security application facilitates validation of the authentication request via a network distributed implementation and optionally communicates with the policy server via a secure API. The policy server with which the security application communicates optionally depends upon corporate location of the client system and/or corporate role of the authorized client to which the authentication request is associated. According to one or more respective embodiments, the security application validates the authentication request (or respective aspects thereof) through use of one or more authentication components located on, attached to, integrated into, or otherwise operatively coupled to the secure device (e.g., at least one hardware device 139). Respective methods of validating the authentication request in accordance with step 210 are described with respect to FIGS. 3-6.

In an embodiment, the authentication request is validated only upon confirming that the secure device is within a predetermined location or geographic range. According to such embodiment, the security application optionally validates the authentication request only upon confirming that the secure device is within a designated location within the defined corporate environment (e.g., within a certain office at a corporate location). Additionally or alternatively, the security application optionally validates the authentication request only upon confirming that the secure device is within range of (e.g., within a certain distance of) the client system and/or within range of a policy server with which the security application communicates based upon corporate location of the client system and/or corporate role of the authorized client to which the authentication request is associated. According to such embodiment, the security application may ensure that the secure device is within a certain designated location or geographic area in order to validate the authentication request. Such location-based authentication may ensure that the secure device is nonfunctional in the event that the secure device is lost, stolen, or otherwise handled in an unauthorized manner. For instance, in a scenario in which the secure device must be initialized in a secured environment, e.g., within a predefined proximity of a master controller of the policy server with which the security application communicates, the security application validates the authentication request only upon confirming, through use of technology configured to determine location, that the secure device is within the predefined proximity to the policy server master controller.

Responsive to determining that the authentication request is invalid, i.e., responsive to determining a validation failure, optionally at step 215 the security application sends at least one authentication failure alert. In an embodiment, the at least one authentication failure alert includes an authentication failure notification to an owner or an administrator of the secure device. Additionally or alternatively, the at least one authentication failure alert includes an authentication failure notification to the policy server with which the security application communicates and optionally one or more other policy servers among the at least one policy server. Additionally or alternatively, the at least one authentication failure alert includes an authentication failure notification to at least one authorized client notification device predetermined for the authorized client to which the authentication request is associated (e.g., at least one client notification device 185). Any such authentication failure notification optionally includes metadata regarding time, date, authentication method(s), the authorized client, and/or the client system associated with the failed authentication request. Furthermore, responsive to validation failure, optionally at step 220 the security application disables any authentication functionality of the secure device for a predetermined duration subsequent to the failed authentication request. Such disablement enables an owner or an administrator of the secure device to address the failed authentication request prior to any subsequent authentication request.

According to a default embodiment, the security application proceeds to the end of the method 200 upon determining that the authentication request is valid and upon optionally executing step 215 and/or step 220. According to an alternative embodiment, responsive to determining that the authentication request is invalid, and subsequent to any predetermined duration of disablement of authentication functionality in accordance with step 220, the method 200 optionally returns to step 205, where the security application receives an updated authentication request for the client system, as indicated by the broken arrow from step 220 to step 205 in FIG. 2. According to such alternative embodiment, in addition to receiving the updated authentication request per step 205, the security application may repeat one or more other steps of the method 200 in the context of the updated authentication request. A user may submit an updated authentication request in an attempt to address any validation deficiency with respect to the authentication request originally received at step 205 (or with respect to previously received authentication request(s) in the event of multiple validation failures).

Responsive to determining that the authentication request is valid, i.e., responsive to validating the authentication request, at step 225 the security application initializes the secure device with respect to the client system. The security application initializes the secure device responsive to validating the user as the authorized client to which the authentication request is associated. In the context of the method 200 and the other methods described herein, initializing the secure device with respect to the client system includes establishing a connection and initiating data exchange between the secure device and the client system, e.g., such that the secure device is capable of transferring secure data to the client system. In an embodiment, the security application initializes the secure device with respect to the client system by physically and/or electronically connecting the secure device to the client system. According to such embodiment, the secure device is physically connected to the client system via at least one hardware port (e.g., via a USB port or other port(s) compatible with the secure device). Additionally or alternatively, the secure device is connected to the client system electronically (e.g., wirelessly) via at least one secure network connection. In a further embodiment, functionality of the secure device (beyond any necessary authentication functionality) is disabled by default until initialization with respect to the client system or another client system. According to such further embodiment, contents of the secure device are inaccessible (e.g., encrypted or otherwise protected from data intrusion) in the event that the secure device is lost, stolen, or otherwise handled in an unauthorized manner. According to such further embodiment, in the event that there is an unauthorized attempt to access contents of the secure device, the secure device would remain nonfunctional even upon physical connection to a hardware device port such as a USB port and/or even following an attempt to electronically connect the secure device to a network. According to such further embodiment, hardware and/or software related to authentication functionality of the secure device optionally is partitioned from hardware and/or software related to other functionality of the secure device. Additionally or alternatively, according to such further embodiment, the security application optionally handles software aspects related to authentication functionality of the secure device distinctly and/or separately from software aspects related to other functionality of the secure device.

The security application accesses the client system in order to initialize the secure device with respect to the client system according to step 225. In an embodiment, accessing the client system in the context of secure device initialization includes confirming authorized client access to the client system. In the event that the client system does not have a predefined password (e.g., the client system is new), the security application initializes the secure device with respect to the client system once the authorized client logs onto the client system, without any further authorized client access confirmation required. Alternatively, in the event that the client system includes a predefined password, the security application optionally requests the predefined password from the authorized client and facilitates loading of the predefined password onto the secure device such that the security application may access the client system via the predefined password. As an alternative to confirming authorized client access to the client system, in the event that the client system includes a predefined password, the security application optionally accesses the client system in the context of secure device initialization by bypassing the predefined password. The security application optionally bypasses the predefined password via a predefined password extraction technique such as a PowerShell tool, a shellcode script (e.g., reverse shell), and/or a memory dump of the predefined password stored on memory.

In an embodiment, the security application is configured to initialize the secure device with respect to the client system only, without capability or authority to initialize the secure device with respect to any other system. According to such embodiment, the secure device is configured to store or otherwise access identifying information associated with the client system such that the security application is capable of confirming identity of the client system prior to initialization. Such identifying information optionally includes network information uniquely associated with the client system, such as a media access control (MAC) address, and/or one or more serial numbers uniquely associated with the client system, such as serial number.

In an embodiment, responsive to determining that the authorized client of the client system has a domain account such that credentials are stored on a directory server (e.g., directory server 187) rather than on the client system, the security application initializes the secure device with respect to the client system at step 225 by connecting to the directory server. The directory server optionally is a domain controller. According to such embodiment, responsive to validating the authentication request of the authorized client, the security application connects to the directory server to initialize the secure device with respect to the client system and to create the password. Furthermore, according to such embodiment, the security application optionally injects the password into the directory server, e.g., by automatically configuring the directory server to accept the password.

At step 230, the security application creates a password for the client system in compliance with policy criteria associated with the defined corporate environment. In an embodiment, the password is a random password. Creating the password optionally comprises creating an initial password for initial authentication of the client system, e.g., in the event that the client system is new. Alternatively, creating the password comprises resetting a predefined password previously provided for the client system. In a further embodiment, the policy criteria provide a set duration (timeout period) following initialization of the secure device with respect to the client system during which the password may be created. For instance, according to such further embodiment, per the policy criteria the security application may create the password for up to one hour following initialization. In a further embodiment, the security application facilitates storage of the created password along with identifying information associated with the client system, including network information uniquely associated with the client system, such as a MAC address, and/or one or more serial numbers uniquely associated with the client system, such as serial number. The security application optionally facilitates such storage within secure device data of the secure device and/or within the client system.

In an embodiment, the policy criteria associated with the defined corporate environment are stored and/or managed via respective policy servers among the at least one policy server. Each of the at least one policy server includes a set of policies, among which are the policy criteria. The policy criteria include password criteria associated with the defined corporate environment, which provide rules with respect to password requirements (e.g., length, complexity, content, maximum lifespan, etc.) and further provide rules with respect to handling any password conflicts. Optionally, the password criteria provide at least one encryption requirement, e.g., with respect to algorithm(s), key size(s) and/or block size(s). The policy criteria further include access control criteria associated with the defined corporate environment, which provide rules with respect to privacy and/or read/write permissions of respective authorized clients and/or corporate administrators. A policy server among the at least one policy server optionally controls policy within the entirety of the defined corporate environment or alternatively portions thereof. In an additional embodiment, the corporate policy criteria optionally are designated and modified by at least one administrator associated with the at least one policy server. In a further embodiment, the policy criteria are determined based upon a plurality of security policies associated with the defined corporate environment. In a further embodiment, the security application accesses the policy criteria, including the corporate password criteria, from secure device data locally stored on the secure device (e.g., secure device data 143). In an alternative embodiment, the security application accesses the policy criteria by connecting via a secure API to a policy server among the at least one policy server with which the security application communicates based upon corporate location of the client system and/or corporate role of the authorized client to which the authentication request is associated. According to such alternative embodiment, the security application creates the password via a network distributed implementation. A method of creating the password for the client system in accordance with step 230 is described with respect to FIG. 7.

At step 235, the security application encrypts the password created at step 230. The security application encrypts the password via one or more encryption algorithms, optionally using various key sizes and/or bit sizes in accordance with the policy criteria. In an embodiment, the security application encrypts the password through use of a symmetric key algorithm. According to such embodiment, the security application optionally applies an Advanced Encryption Standard (AES) algorithm, i.e., Rijndael, or an algorithm derived from or related to AES. Additionally or alternatively, according to such embodiment the security application optionally applies a Data Encryption Standard (DES) algorithm or an algorithm derived from or related to DES. In an additional embodiment, the security application encrypts the password through use of an asymmetric key algorithm, i.e., a public-key algorithm. According to such additional embodiment, the security application optionally applies a Rivest-Shamir-Adleman (RSA) algorithm or an algorithm derived from or related to RSA. In a further embodiment, the security application encrypts the password through use of a hash algorithm. According to such further embodiment, the security application optionally applies a Secure Hash Algorithm (SHA) algorithm or an algorithm derived from or related to SHA. In a further embodiment, the security application encrypts the password via block encryption, e.g., AES block encryption, of never-repeating counter values in a block cipher mode of operation, e.g., Cipher Block Chaining (CBC) mode of operation.

Optionally, at step 240 the security application creates access control credentials for the client system in compliance with the policy criteria associated with the defined corporate environment. The created access control credentials comply with any rules designated by the corporate access control criteria among the policy criteria. In an embodiment, the security application determines the access control credentials based upon corporate location of the client system and/or corporate role of the authorized client to which the authentication request is associated. In an additional embodiment, the policy criteria provide a set duration (timeout period) following initialization of the secure device with respect to the client system during which the access control credentials may be created. For instance, according to such additional embodiment, per the policy criteria the security application may create the access control credentials for up to two hours following initialization. In a further embodiment, the security application facilitates storage of the created access control credentials along with the created password and identifying information associated with the client system, e.g., within secure device data of the secure device and/or within the client system. In a further embodiment, the security application encrypts the created access control credentials via at least one encryption algorithm, optionally including one or more of the encryption algorithms applied in the context of step 235. In a further embodiment, the security application encodes the access control credentials using a coding format stipulated by the policy criteria. In a further embodiment, the security application obfuscates the access control credentials using an obfuscation format stipulated by the policy criteria.

At step 245, the security application distributes the password via at least one predetermined technique. In an embodiment, the security application distributes the password via the at least one predetermined technique by injecting the password into the client system, i.e., configuring the client system to accept the password. According to such embodiment, the security application optionally injects the password without disclosing the password directly to a corporate administrator (a local administrator or a directory server administrator) responsible for setting up the security of the client system via the secure device. Rather, upon injecting the password, the security application may only further distribute the password via one or more other techniques among the at least one predetermined technique. According to such embodiment, the security application optionally injects the password into the client system by communicating with the client authentication application of the client system. In an additional embodiment, the security application distributes the access control credentials optionally created at step 240 via the at least one predetermined technique. According to such additional embodiment, the security application optionally injects the access control credentials into the client system, i.e., configures the client system to recognize and adhere to the access control credentials. In a further embodiment, the security application configures the client system with respect to the created password and/or the created access control credentials automatically, such that no manual password and/or access control credential configuration activity is required on the part of a system administrator or the authorized client. In a further embodiment, the security application configures the client system to comply with any preestablished corporate policies (e.g., in terms of privacy, data sharing, etc.) automatically, such that no manual corporate policy configuration activity is required on the part of a system administrator or the authorized client. Since the secure device is compatible with any external operating system and does not require software preinstallation, the security application may configure the client system regardless of the operating system(s) or other software aspects installed thereon.

In an embodiment, the security application distributes the password via the at least one predetermined technique by sending the password to one or more designated recipients associated with the client system, e.g., by sending the password to the authorized client to which the authentication request is associated and optionally one or more other authorized clients associated with the client system. Optionally, the security application further distributes the access control credentials by sending the access control credentials to the one or more designated recipients via the at least one predetermined technique. According to such embodiment, the security application optionally distributes the password and/or the access control credentials wirelessly via the network associated with the defined corporate environment. According to such embodiment, the security application optionally distributes the password and/or the access control credentials to at least one authorized client notification device predetermined for the authorized client to which the authentication request is associated and optionally further distributes the password and/or the access control credentials to at least one authorized client notification device predetermined for one or more other authorized clients associated with the client system. Additionally or alternatively, the security application distributes the password and/or the access control credentials via the at least one predetermined technique by sending the password and/or the access control credentials to administrative personnel associated with the defined corporate environment, e.g., administrative personnel associated with one or more policy servers among the at least one policy server. In a further embodiment, distributing the password and/or the access control credentials via the at least one predetermined technique optionally includes uploading the password and/or the access control credentials to at least one secure database, e.g., a database accessible via the client system and/or one or more policy servers among the at least one policy server.

In the context of distributing the password and/or the access control credentials in accordance with one or more of the aforementioned embodiments, the security application optionally creates a hash of the password and/or the access control credentials and sends a copy of the hash (rather than the password/access control credentials). Moreover, the security application optionally adds further security in the context of creating the hash by randomizing each hash through addition of a random string, i.e., a salt, to the password and/or the access control credentials prior to creating the hash. The security application optionally determines such salt based upon predetermined corporate standards or alternatively determines such salt dynamically, e.g., via a random number generator.

According to a default embodiment, the security application proceeds to the end of the method 200 upon distributing the password (and optionally the access control credentials) at step 245. According to an alternative embodiment, upon distributing the password at step 245, the method 200 optionally returns to step 205, where the security application receives an additional authentication request associated with an additional authorized client of an additional client system, as indicated by the broken arrow from step 245 to step 205 in FIG. 2. The additional authentication request optionally is distinct in technique and content to the authentication request originally received. For instance, while the original authentication request may include a biometric aspect, the additional authentication request may include multiple gestures. Alternatively, the additional authentication request optionally is similar in technique and/or content to the authentication request originally received, e.g., in a scenario in which the additional client system and/or the additional authorized client are similar to the original client system and/or the original authorized client. According to such alternative embodiment, in addition to receiving the additional authentication request per step 205, the security application may repeat one or more other steps of the method 200 in the context of the additional authentication request. More specifically, the security application optionally initializes the secure device with respect to the additional client system responsive to validating the additional authentication request, creates an additional password for the additional client system, encrypts the additional password, creates additional access control credentials for the additional client system, and/or distributes the created additional password and/or the created additional access control credentials. Any created additional password and/or any created additional access control credentials optionally are in accordance with the policy criteria established for the originally created password and access control credentials or alternatively are in accordance with other policy criteria based upon corporate location of the additional client system and/or corporate role of the additional authorized client to which the additional authentication request is associated. The security application optionally is configured to receive further respective additional authentication requests, in which case one or more steps of the method 200 may be repeated multiple times. Thus, the secure device may be configured to create respective passwords (and optionally access control credentials) for multiple client systems throughout the defined corporate environment, e.g., within an office environment or more generally throughout a company, government agency, or other organization.

Figure 3:
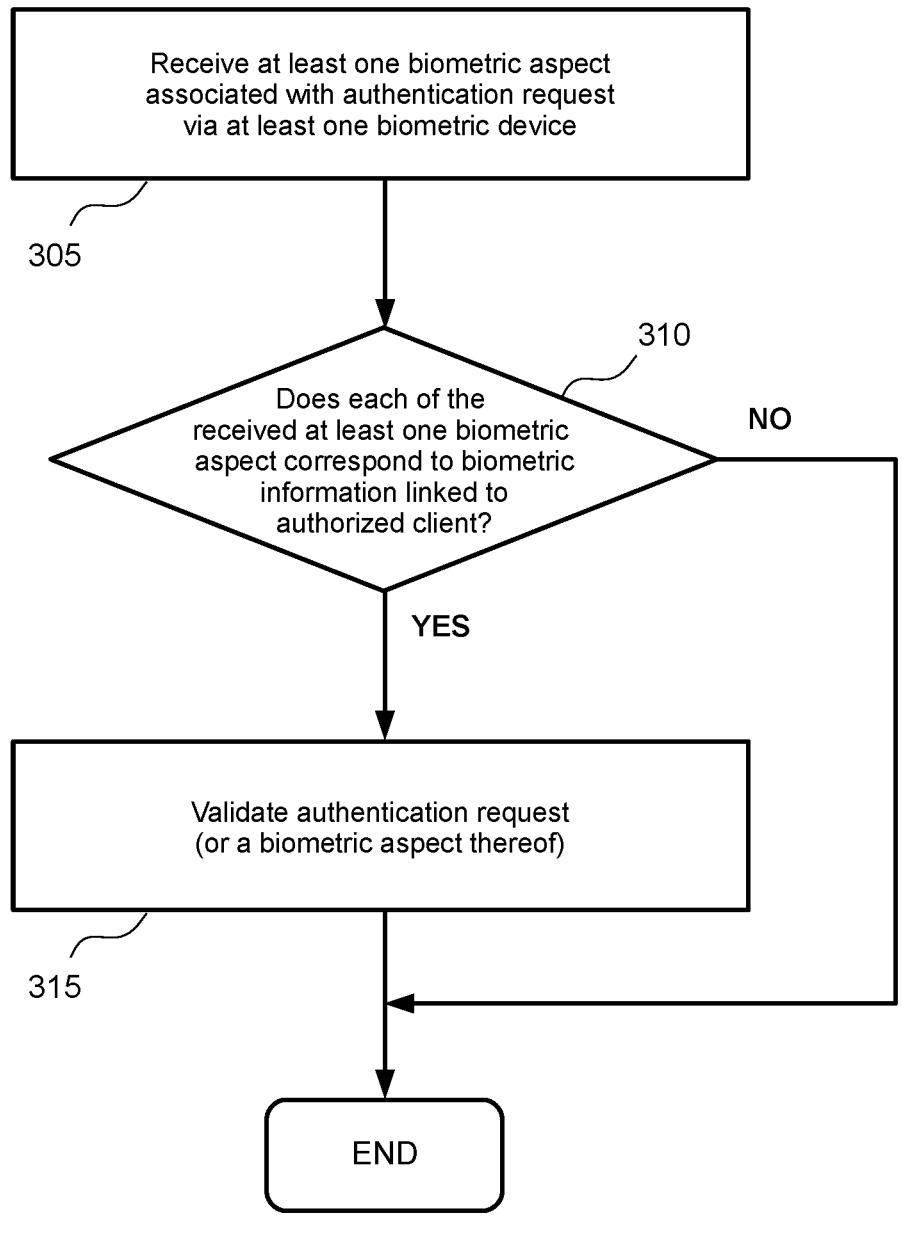
FIG. 3 illustrates a method of validating an authentication request associated with an authorized client of a client system, according to one or more embodiments.

FIG. 3 illustrates a method 300 of validating the authentication request associated with the authorized client of the client system. The method 300 provides one or more example embodiments with respect to determining whether the authentication request is valid in accordance with step 210 of the method 200. According to the method 300, based upon a biometric submission associated with the authentication request, the security application validates the authentication request (or a biometric aspect thereof) by confirming authorized client identity, i.e., by confirming that the user submitting the authentication request is the authorized client to which the authentication request is associated. The method 300 begins at step 305, where the security application receives, via at least one biometric device, at least one biometric aspect associated with the authentication request. In an embodiment, one or more of the at least one biometric device is a hardware device that optionally incorporates one or more biometric software aspects. According to such embodiment, the security application receives a fingerprint submission via a fingerprint reader hardware device configured for fingerprint recognition. Additionally or alternatively, the security application receives a retinal scan submission and/or an iris scan submission via an eye scanner hardware device configured for retina recognition and/or iris recognition. Additionally or alternatively, the security application receives a facial scan submission via at least one photographic and/or video hardware device configured for facial recognition. Additionally or alternatively, the security application receives a voice submission via an audio hardware device configured for audio recognition. Additionally or alternatively, the security application receives a handwriting submission (e.g., a signature submission) via an optical scanner hardware device configured for handwriting recognition. In an additional embodiment, a single biometric device among the at least one biometric device optionally is configured to receive multiple biometric aspects, e.g., a single device may be configured to receive both a retinal scan submission and a facial scan submission. In a further embodiment, the at least one biometric device is located on, attached to, integrated into, or otherwise operatively coupled to the secure device. Alternatively, the at least one biometric device is located on, attached to, integrated into, or otherwise operatively coupled to the user authentication device associated with the user submitting the authentication request, in which case the security application receives the at least one biometric aspect and any biometric device interpretation thereof upon transmission from the user authentication device to the secure device.

At step 310, the security application confirms whether each of the received at least one biometric aspect corresponds to biometric information linked to the authorized client of the client system. In an embodiment, the security application confirms correspondence according to step 310 by comparing the received at least one biometric aspect associated with the authentication request with biometric information linked to the authorized client of the client system stored in a corporate directory database. In the context of the various embodiments described herein, a corporate directory database optionally is a database having some or all aspects locally stored on the secure device among secure device data. Additionally or alternatively, the corporate directory database has some or all aspects remotely stored among at least one secure device authentication server (e.g., at least one secure device authentication server 183). The at least one secure device authentication server is configured to store client authentication information related to the secure device and optionally is configured to store client authentication information related to a one or more other secure devices associated with corporate password creation in the defined corporate environment. The security application optionally communicates with the at least one secure device authentication server via a secure API.

Responsive to confirming that each of the received at least one biometric aspect corresponds to the biometric information linked to the authorized client of the client system, at step 315 the security application validates the authentication request (or a biometric aspect thereof). The security application confirms correspondence between each of the received at least one biometric aspect and the biometric information linked to the authorized client and thus validates the authentication request (or a biometric aspect thereof) responsive to determining a match between each of the received at least one biometric aspect and the biometric information linked to the authorized client, e.g., within a predetermined margin of error. Conversely, responsive to determining that one or more of the received at least one biometric aspect does not correspond to the biometric information linked to the authorized client of the client system, the security application proceeds to the end of the method 300 without validating the authentication request.

Figure 4:
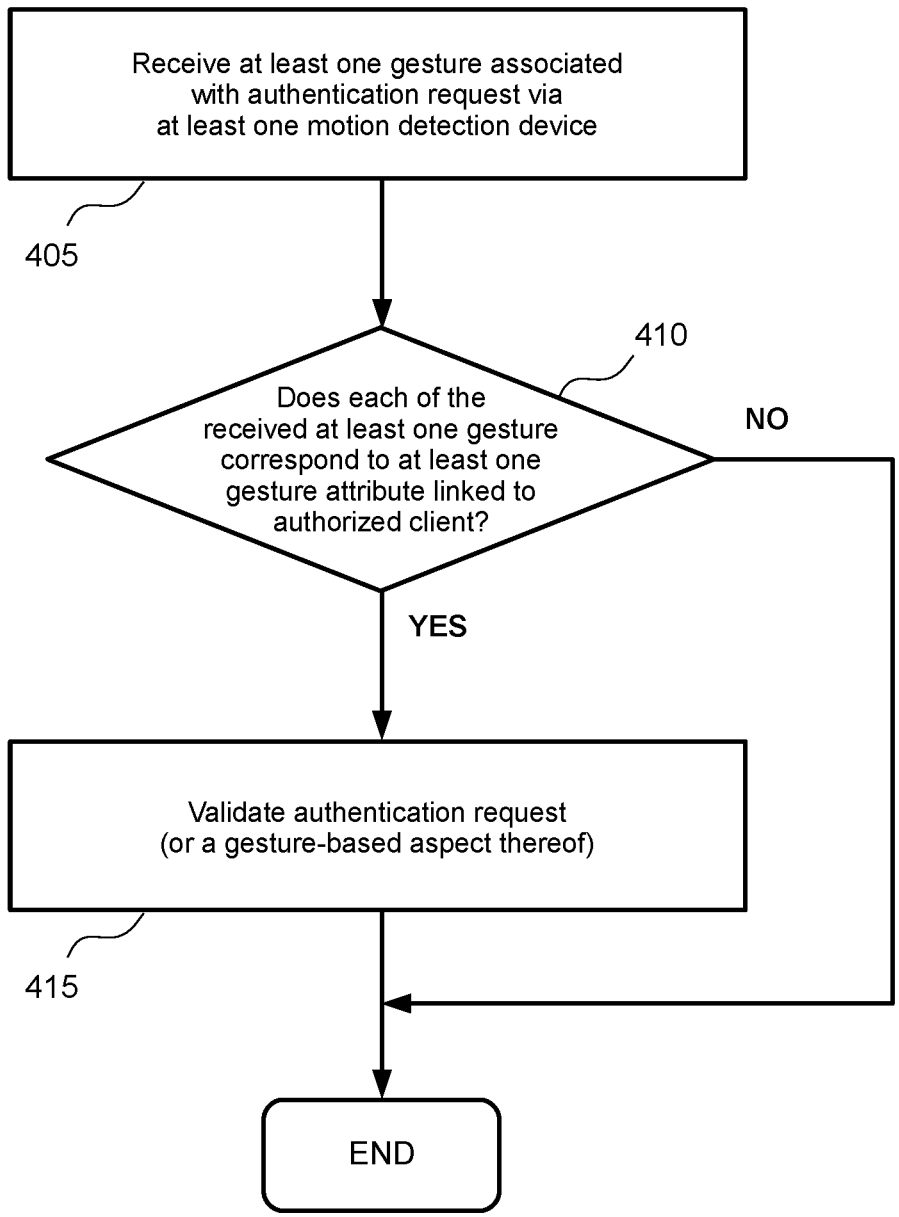
FIG. 4 illustrates a method of validating an authentication request associated with an authorized client of a client system, according to one or more further embodiments.

FIG. 4 illustrates a method 400 of validating the authentication request associated with the authorized client of the client system. The method 400 provides one or more further example embodiments with respect to determining whether the authentication request is valid in accordance with step 210 of the method 200. According to the method 400, based upon a gesture submission associated with the authentication request, the security application validates the authentication request (or a gesture-based aspect thereof) by confirming authorized client identity. The method 400 begins at step 405, where the security application receives, via at least one motion detection device, at least one gesture associated with the authentication request. In an embodiment, one or more of the at least one motion detection device is a hardware device that optionally incorporates motion detection software aspects. According to such embodiment, the security application receives the at least one gesture via an accelerometer. Additionally or alternatively, the security application receives the at least one gesture via at least one camera sensor. Additionally or alternatively, the security application receives at least one gesture via at least one other motion detection device configured to detect gesture submissions. In an additional embodiment, the at least one gesture includes a sequence of interrelated gestures. In a further embodiment, the security application receives the at least one gesture in response to a gesture challenge request transmitted by the security application to the user submitting the authentication request, e.g., via a GUI or a CLI of the user authentication device associated with the user. According to such further embodiment, the security application may receive from the user an initial request for authentication, in response the security application may transmit a gesture challenge request to the user, and in turn the security application may receive from the user the at least one gesture per step 405. In a further embodiment, the at least one motion detection device is located on, attached to, integrated into, or otherwise operatively coupled to the secure device. Alternatively, the at least one motion detection device is located on, attached to, integrated into, or otherwise operatively coupled to the user authentication device associated with the user submitting the authentication request, in which case the security application receives the at least one gesture and any motion detection device interpretation thereof upon transmission from the user authentication device to the secure device.

At step 410, the security application confirms whether each of the received at least one gesture corresponds to at least one gesture attribute linked to the authorized client of the client system. In an embodiment, the at least one gesture attribute linked to the authorized client includes a predetermined gesture sequence of interrelated gestures uniquely associated with the authorized client, e.g., distinct linear motions, chopping motions, twisting motions, and/or distinct shape(s) such as a figure eight distinctively associated with the authorized client. In an additional embodiment, the security application optionally accesses the corporate directory database to retrieve the at least one gesture attribute linked to the authorized client for purposes of confirmation. In a further embodiment, in order to confirm correspondence and thus validate the authentication request via an accelerometer, at least one camera sensor, and/or another motion detection device, the security application submits a confidential gesture challenge request to the user authentication device associated with the user submitting the authentication request, e.g., a smartphone associated with the user, requesting gesture-based movement of the user authentication device in accordance with the at least one gesture attribute (e.g., including a predetermined gesture sequence) linked to the authorized client of the client system, and in turn the security application analyzes any received gesture-based movement captured via the at least one motion detection device. In an alternative embodiment, the security application submits a confidential gesture challenge request to at least one authorized client notification device predetermined for the authorized client to which the authentication request is associated, e.g., a smartphone of the authorized client, requesting gesture-based movement of one or more of the at least one authorized client notification device in in accordance with the at least one gesture attribute linked to the authorized client of the client system, and in turn the security application analyzes any received gesture-based movement captured via the at least one motion detection device.

Responsive to confirming that each of the received at least one gesture corresponds to the at least one gesture attribute linked to the authorized client of the client system, at step 415 the security application validates the authentication request (or a gesture-based aspect thereof). The security application confirms correspondence between each of the received at least one gesture and the predetermined gesture sequence linked to the authorized client and thus validates the authentication request (or a gesture-based aspect thereof) responsive to determining a match between each of the received at least one gesture and the at least one gesture attribute, e.g., within a predetermined margin of error. For instance, the security application may confirm correspondence responsive to determining a match, within the predetermined margin of error, between each gesture among gesture-based movement received per step 405 and a predetermined gesture sequence included among the at least one gesture attribute. Conversely, responsive to determining that one or more of the received at least one gesture does not correspond to the at least one gesture attribute linked to the authorized client of the client system, the security application proceeds to the end of the method 400 without validating the authentication request.

Figure 5:
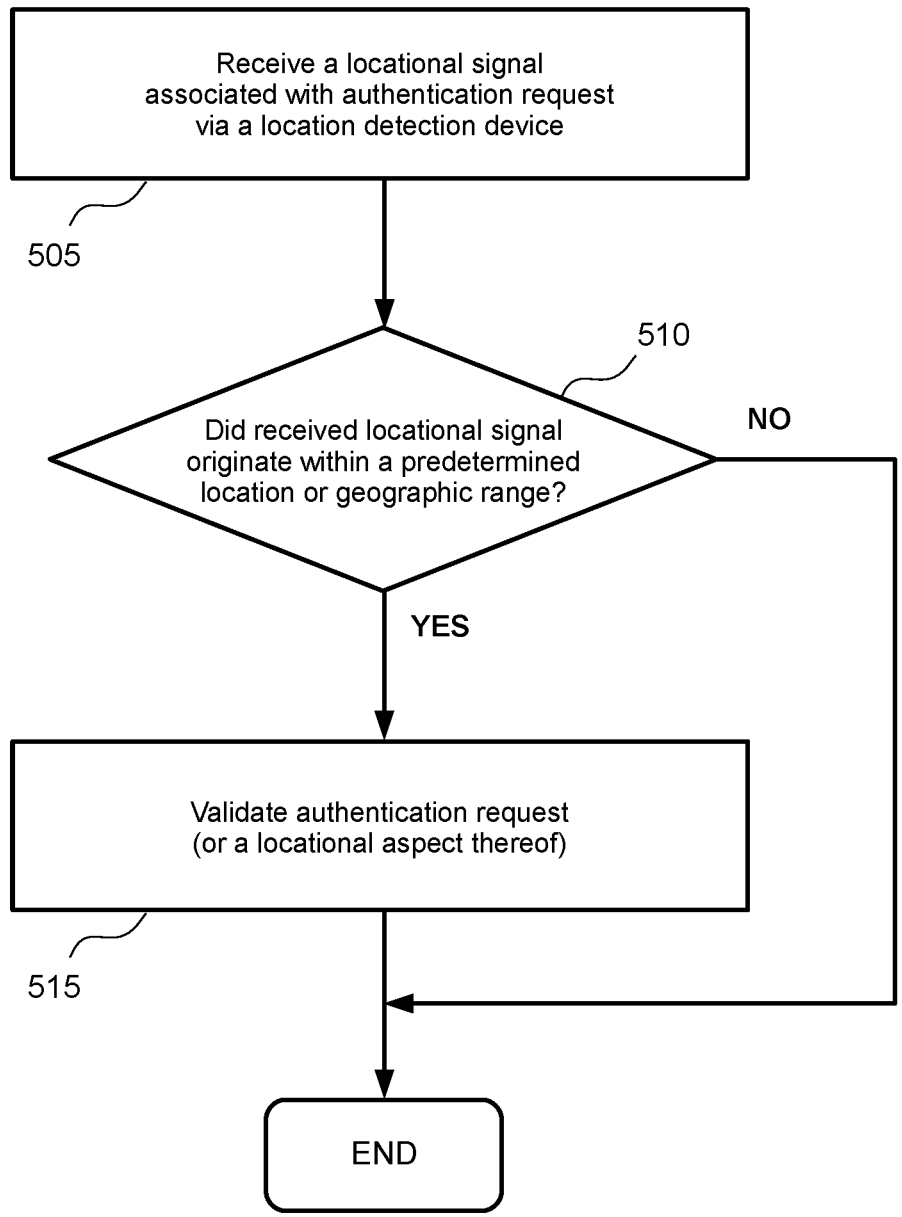
FIG. 5 illustrates a method of validating an authentication request associated with an authorized client of a client system, according to one or more further embodiments.

FIG. 5 illustrates a method 500 of validating the authentication request associated with the authorized client of the client system. The method 500 provides one or more further example embodiments with respect to determining whether the authentication request is valid in accordance with step 210 of the method 200. According to the method 500, based upon a location-based submission associated with the authentication request, the security application validates the authentication request (or a locational aspect thereof) by confirming origin of the location-based submission. The method 500 begins at step 505, where the security application receives, via a location detection device, a locational signal associated with the authentication request. In an embodiment, the locational signal includes a GPS signal originating from the user authentication device associated with the user submitting the authentication request (e.g., a smartphone associated with the user). In an additional embodiment, the location detection device is a hardware device that optionally incorporates one or more georeferencing software aspects. According to such additional embodiment, the location detection device is located on, attached to, integrated into, or otherwise operatively coupled to the secure device. Alternatively, the location detection device is located on, attached to, integrated into, or otherwise operatively coupled to the user authentication device associated with the user submitting the authentication request, in which case the security application receives the locational signal and any location detection device interpretation thereof upon transmission from the user authentication device to the secure device.

At step 510, the security application confirms whether the received locational signal originated within a predetermined location or geographic range. The security application validates the authentication request (or a locational aspect thereof) upon determining that the received locational signal originated within the predetermined location or geographic range. In an embodiment, the predetermined location or geographic range according to step 510 pertains to a predetermined certain location within the defined corporate environment and/or a predetermined geographic range with respect to the secure device, e.g., such that the security application confirms that the received locational signal originated within the predetermined certain location and/or that the received locational signal originated within the predetermined geographic range of the secure device. According to the method 500, the security application validates the authentication request only if the authentication request originated within the predetermined location or geographic range, such that validation of the authentication request is determined at least in part based upon originating location of the authentication request. Responsive to confirming that the received locational signal originated within a predetermined location or geographic range, at step 515 the security application validates the authentication request (or a locational aspect thereof). Conversely, responsive to determining that the received locational signal did not originate within the predetermined location or geographic range, the security application proceeds to the end of the method 500 without validating the authentication request.

Optionally, in the event of multiple locational signals received via the location detection device, the security application validates the authentication request (or a locational aspect thereof) only upon determining that each of the multiple received locational signals originated within the predetermined location or geographic range. For instance, the security application may validate the authentication request (or a locational aspect thereof) only upon determining that each of two received GPS signals originated within the predetermined location or geographic range.

Figure 6:
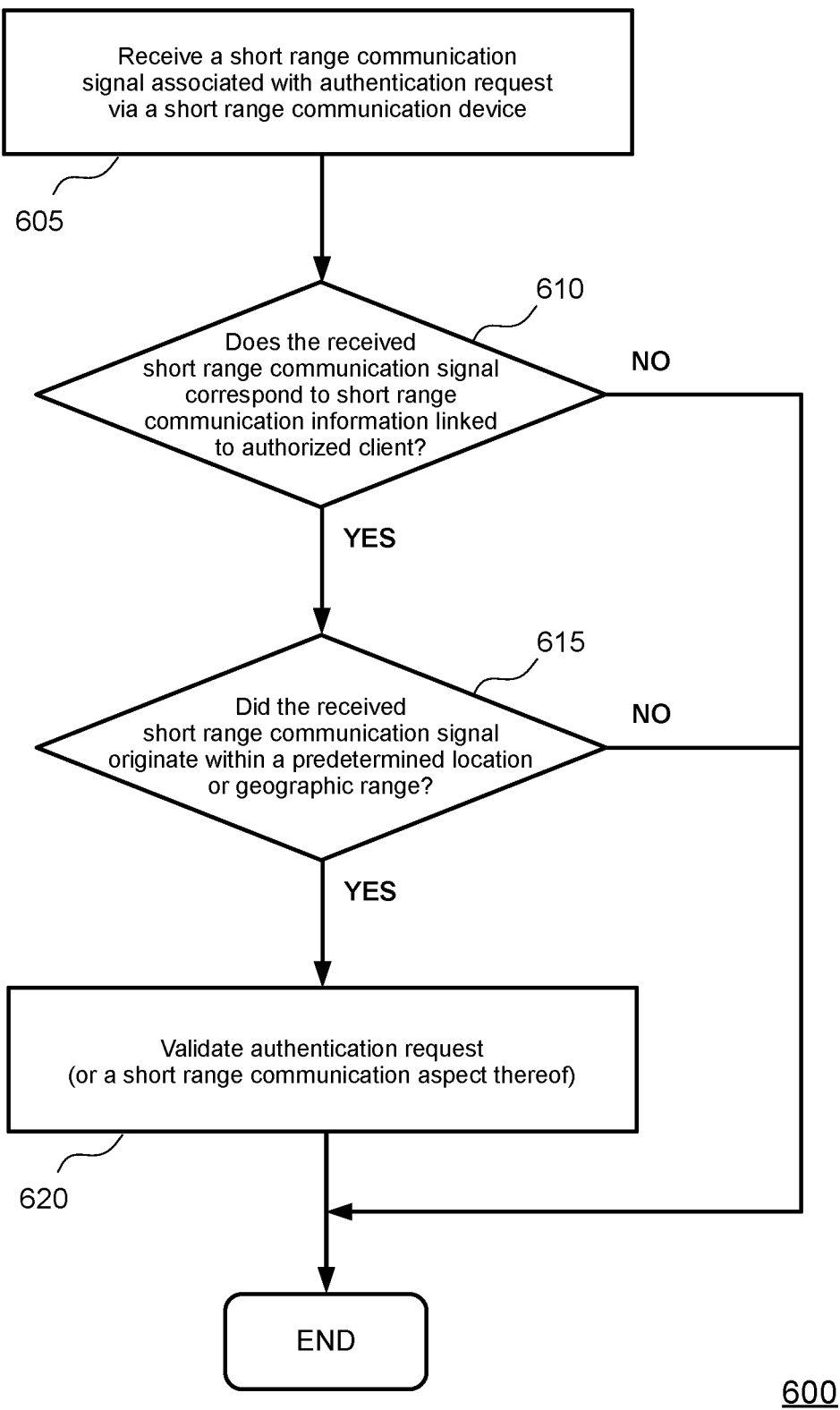
FIG. 6 illustrates a method of validating an authentication request associated with an authorized client of a client system, according to one or more further embodiments.

FIG. 6 illustrates a method 600 of validating the authentication request associated with the authorized client of the client system. The method 600 provides one or more further example embodiments with respect to determining whether the authentication request is valid in accordance with step 210 of the method 200. According to the method 600, based upon a short range communication submission associated with the authentication request, the security application validates the authentication request (or a short range communication aspect thereof) by confirming authorized client identity and further by confirming origin of the short range communication submission. The method 600 begins at step 605, where the security application receives, via a short range communication device, a short range communication signal associated with the authentication request. In the context of the various embodiments described herein, a short range communication signal is a signal wirelessly sent between or among devices and/or systems, e.g., a RFID signal or NFC signal. In an embodiment, the received short range communication signal is an NFC signal originating from the user authentication device associated with the user submitting the authentication request. In an additional embodiment, the received short range communication signal is an RFID signal originating from an RFID card or an RFID tag. In the context of the various embodiments described herein, a short range communication device is a device (or a component thereof) configured to receive a short range communication signal. In an embodiment, the short range communication device is a hardware device that optionally incorporates one or more short range communication software aspects. A short range communication device optionally is a RFID reader configured to read radio frequency signals emitted from RFID tags or RFID cards and/or a device configured to receive and interpret NFC signals. In a further embodiment, the security application validates an RFID-based authentication request through use of a card reader and/or tag reader configured to capture and interpret an RFID signal (e.g. a signal from a proximity card/access control card/HID card or from an RFID tag) in order to confirm an authorized client RFID request. In a further embodiment, the security application validates an NFC-based authentication request though use of a device (or component thereof) configured to capture and interpret an NFC signal via use of a relevant set of NFC communication protocols. In a further embodiment, the short range communication device is located on, attached to, integrated into, or otherwise operatively coupled to the secure device. Alternatively, the short range communication device is located on, attached to, integrated into, or otherwise operatively coupled to the user authentication device associated with the user submitting the authentication request, in which case the security application receives the short range communication signal and any short range communication device interpretation thereof upon transmission from the user authentication device to the secure device.

At step 610, the security application confirms whether the received short range communication signal corresponds to short range communication information linked to the authorized client of the client system. The short range communication information optionally includes one or more short range communication signal patterns and/or signal metadata uniquely associated with the authorized client. In an embodiment, the security application optionally accesses the corporate directory database to retrieve the short range communication information linked to the authorized client for purposes of confirmation. According to such embodiment, the short range communication information linked to the authorized client is included in the corporate directory database. Responsive to confirming that the received short range communication signal corresponds to the short range communication information linked to the authorized client of the client system, the security application proceeds to step 615. The security application confirms correspondence between the received short range communication signal and the short range communication information linked to the authorized client responsive to determining a match between the received short range communication signal and the short range communication information linked to the authorized client, e.g., within a predetermined margin of error. Conversely, responsive to determining that the received short range communication signal does not correspond to the short range communication information linked to the authorized client of the client system, the security application proceeds to the end of the method 600 without validating the authentication request.

At step 615, the security application confirms whether the received short range communication signal originated within a predetermined location or geographic range. In an embodiment, the predetermined location or geographic range according to step 615 pertains to a predetermined certain location within the defined corporate environment and/or a predetermined geographic range with respect to the secure device, e.g., such that the security application confirms that the received short range communication signal originated within the predetermined certain location and/or that the received short range communication signal originated within the predetermined geographic range of the secure device. Responsive to confirming that the received short range communication signal originated within the predetermined location or geographic range, at step 620 the security application validates the authentication request (or a short range communication aspect thereof). Conversely, responsive to confirming that the received short range communication signal did not originate within the predetermined location or geographic range, the security application proceeds to the end of the method 600 without validating the authentication request.

According to the method 600, the security application validates the authentication request (or a short range communication aspect thereof) only upon both confirming correspondence between the received short range communication signal and the short range communication information linked to the authorized client and confirming that the received short range communication signal originated within the predetermined location or geographic range. In an embodiment, the security application disables a pending validation of the authentication request (or at least a short range communication aspect thereof) responsive to loss of a consistent short range communication signal. For instance, the security application may disable a pending validation upon loss of an RFID signal or an NFC signal during the validation process. Optionally, in the event of multiple short range communication signals received via one or multiple short range communication devices, the security application validates the authentication request (or a short range communication aspect thereof) only upon determining that each of the multiple received short range communication signals corresponds to the short range communication information linked to the authorized client of the client system and originated within the predetermined location or geographic range. For instance, the security application may validate the authentication request (or a short range communication aspect thereof) only upon determining that each of a received RFID signal and a received NFC signal corresponds to the short range communication information linked to the authorized client and originated within the predetermined location or geographic range.

According to one or more alternative embodiments, the security application executes the steps of the method 600 in alternative configurations. In an alternative embodiment, the security application executes step 615 prior to step 610. In a further alternative embodiment, the security application executes only step 605 and 610, omitting step 615, in which case validation of the authentication request (or a short range communication aspect thereof) depends only upon confirming that the received short range communication signal corresponds to the short range communication information linked to the authorized client of the client system. In a further alternative embodiment, the security application executes only step 605 and 615, omitting step 610, in which case validation of the authentication request (or a short range communication aspect thereof) depends only upon confirming that the received short range communication signal originated within the predetermined location or geographic range. Optionally, the predetermined location or geographic range discussed with respect to the method 600 is identical to the predetermined location or geographic range discussed with respect to the method 500. Alternatively, the predetermined location or geographic range discussed with respect to the method 600 is distinct from the predetermined location or geographic range discussed with respect to the method 500.

In an embodiment, the technique(s) among at least one predetermined technique via which the security application distributes the password at step 245 are determined based upon validation method used with respect to the authentication request. For instance, the security application may send the password to one or more designated recipients associated with the client system based upon receiving at least one biometric aspect (e.g., in accordance with step 305) or at least one gesture associated with the authentication request (e.g., in accordance with step 405). In another instance, the security application may inject the password based upon receiving a locational signal (e.g., in accordance with step 505) or a short range communication signal associated with the authentication request (e.g., in accordance with step 605).

Figure 7:
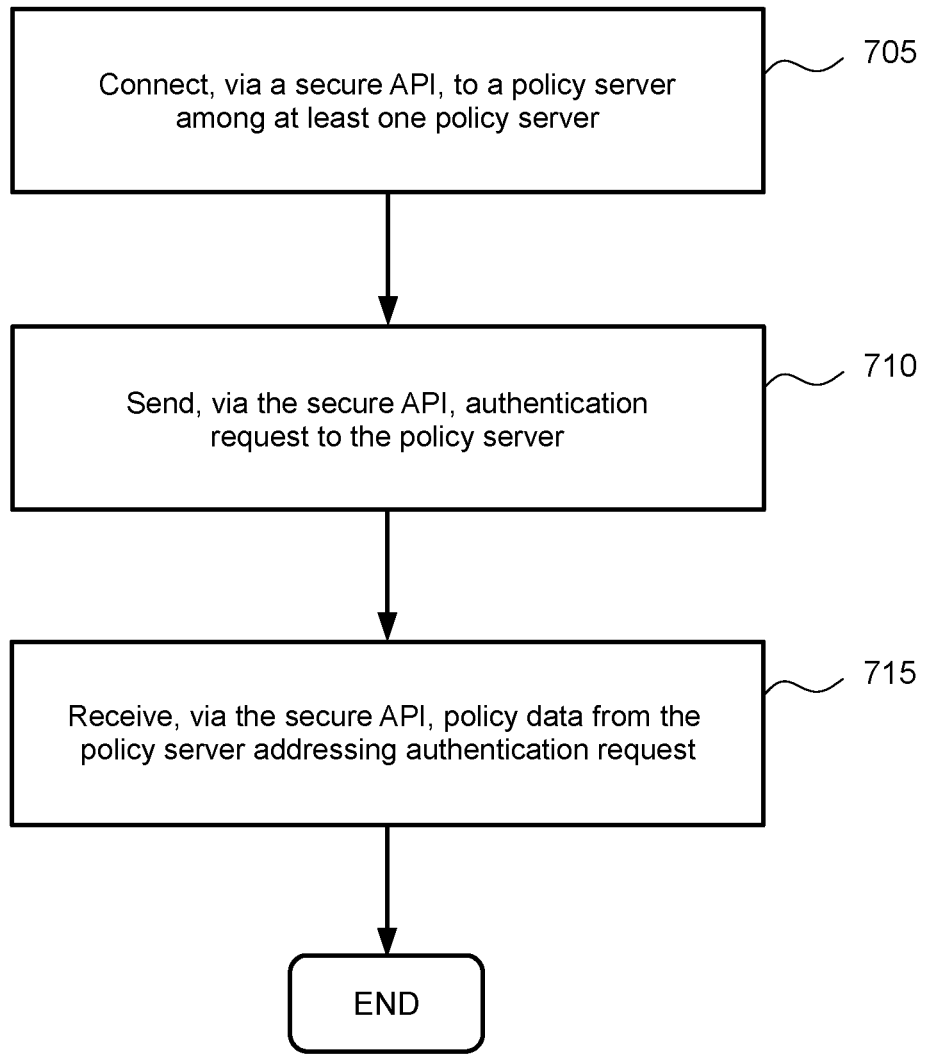
FIG. 7 illustrates a method of creating a password for a client system in a defined corporate environment, according to one or more embodiments.

FIG. 7 illustrates a method 700 of creating the password for the client system in the defined corporate environment. The method 700 provides one or more example embodiments with respect to step 230 of the method 200. The method 700 begins at step 705, where the security application connects, via a secure API, to a policy server among the at least one policy server in the defined corporate environment. Such validation approach optionally involves a network-based distributed authentication though the use of API-based functionality. In an embodiment, the security application determines the policy server among the at least one policy server to which the security application connects based upon corporate location of the client system and/or corporate role of the authorized client to which the authentication request is associated. Respective policy servers among the at least one policy server optionally store particular password policies and/or access control policies based upon location and/or corporate role. In a further embodiment, the security application optionally connects to a different policy server for a subsequent authentication request associated with the client system responsive to a change in corporate location of the client system and/or responsive to a change in corporate role of the authorized client to which the authentication request is associated.

At step 710, the security application sends, via the secure API, the authentication request to the policy server. At step 715, the security application receives, via the secure API, policy data from the policy server addressing the authentication request. In an embodiment, the received policy data includes password criteria for the authorized client associated with the authentication request. Additionally or alternatively, the received policy data includes access control criteria for the authorized client. Additionally or alternatively, the received policy data includes information pertaining to preestablished corporate policies (e.g., in terms of privacy, data sharing, etc.). In an embodiment, the security application operatively or communicatively connects to the policy server during validation of the authentication request at step 210, such that in the context of validation the security application may receive, via the secure API, authentication data from hardware and/or software resource(s) of the policy server in addition to or in lieu of authentication components associated with the secure device or a user authentication device. In a further embodiment, the security application operatively or communicatively connects to the policy server during initialization of the secure device at step 215, such that in the context of initialization the security application may receive, via the secure API, initialization data from hardware and/or software resource(s) of the policy server.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of facilitating password creation in a defined corporate environment via a secure device having self-configuration capabilities, the method comprising:

receiving an authentication request associated with an authorized client of a client system in the defined corporate environment;

responsive to validating the authentication request, initializing the secure device with respect to the client system by connecting the secure device to the client system;

creating a password for the client system in compliance with policy criteria associated with the defined corporate environment, wherein the password is created via a security application loaded on a microcontroller of the secure device;

encrypting the password; and distributing the password by injecting the password into the client system.

2. The computer-implemented method of claim 1, further comprising:

creating access control credentials for the client system in compliance with the policy criteria associated with the defined corporate environment.

3. The computer-implemented method of claim 1, further comprising:

receiving an additional authentication request associated with an additional authorized client of an additional client system;

initializing the secure device with respect to the additional client system responsive to validating the additional authentication request; and creating an additional password for the additional client system.

4. The computer-implemented method of claim 1, wherein the authentication request is validated only upon confirming that the secure device is within a predetermined location or geographic range.

5. The computer-implemented method of claim 1, wherein validating the authentication request comprises:

receiving at least one biometric aspect associated with the authentication request via at least one biometric device; and confirming that each of the received at least one biometric aspect corresponds to biometric information linked to the authorized client of the client system.

6. The computer-implemented method of claim 1, wherein validating the authentication request comprises:

receiving at least one gesture associated with the authentication request via at least one motion detection device; and confirming that each of the received at least one gesture corresponds to at least one gesture attribute linked to the authorized client of the client system.

7. The computer-implemented method of claim 1, wherein validating the authentication request comprises:

receiving a locational signal associated with the authentication request via a location detection device; and confirming that the received locational signal originated within a predetermined location or geographic range.

8. The computer-implemented method of claim 1, wherein validating the authentication request comprises:

receiving a short range communication signal associated with the authentication request via a short range communication device;

confirming that the received short range communication signal corresponds to short range communication information linked to the authorized client of the client system; and confirming that the received short range communication signal originated within a predetermined location or geographic range.

9. The computer-implemented method of claim 1, wherein the secure device is physically connected to the client system.

10. The computer-implemented method of claim 1, wherein the secure device is compatible with Universal Serial Bus human interface device (USB-HID) capabilities.

11. The computer-implemented method of claim 1, wherein the security application is configured to initialize the secure device with respect to the client system only.

12. The computer-implemented method of claim 1, wherein the secure device is a plug-and-play device.

13. A computer program product comprising a computer readable storage medium having program instructions embodied therewith for facilitating password creation in a defined corporate environment via a secure device having self-configuration capabilities, the program instructions executable by a computing device to cause the computing device to:

receive an authentication request associated with an authorized client of a client system in the defined corporate environment;

responsive to validating the authentication request, initialize the secure device with respect to the client system by connecting the secure device to the client system;

create a password for the client system in compliance with policy criteria associated with the defined corporate environment, wherein the password is created via a security application loaded on a microcontroller of the secure device;

encrypt the password; and distribute the password by injecting the password into the client system.

14. The computer program product of claim 13, wherein the program instructions further cause the computing device to:

create access control credentials for the client system in compliance with the policy criteria associated with the defined corporate environment.

15. The computer program product of claim 13, wherein the program instructions further cause the computing device to:

receive an additional authentication request associated with an additional authorized client of an additional client system;

initialize the secure device with respect to the additional client system responsive to validating the additional authentication request; and create an additional password for the additional client system.

16. The computer program product of claim 13, wherein the authentication request is validated only upon confirming that the secure device is within a predetermined location or geographic range.

17. A system comprising:

a processor; and a memory storing an application program, which, when executed on the processor, performs an operation of facilitating password creation in a defined corporate environment via a secure device having self-configuration capabilities, the operation comprising:

receiving an authentication request associated with an authorized client of a client system in the defined corporate environment;

responsive to validating the authentication request, initializing the secure device with respect to the client system by connecting the secure device to the client system;

creating a password for the client system in compliance with policy criteria associated with the defined corporate environment, wherein the password is created via a security application loaded on a microcontroller of the secure device;

encrypting the password; and distributing the password by injecting the password into the client system.

18. The system of claim 17, wherein the operation further comprises:

creating access control credentials for the client system in compliance with the policy criteria associated with the defined corporate environment.

19. The system of claim 17, wherein the operation further comprises:

receiving an additional authentication request associated with an additional authorized client of an additional client system;

initializing the secure device with respect to the additional client system responsive to validating the additional authentication request; and creating an additional password for the additional client system.

20. The system of claim 17, wherein the authentication request is validated only upon confirming that the secure device is within a predetermined location or geographic range.

* * * * *